(No Model.) 3 Sheets—Sheet 1.
G. W. KRAMER.
APPARATUS FOR WEIGHING AND CONVEYING GRAIN.
No. 571,571. Patented Nov. 17, 1896.
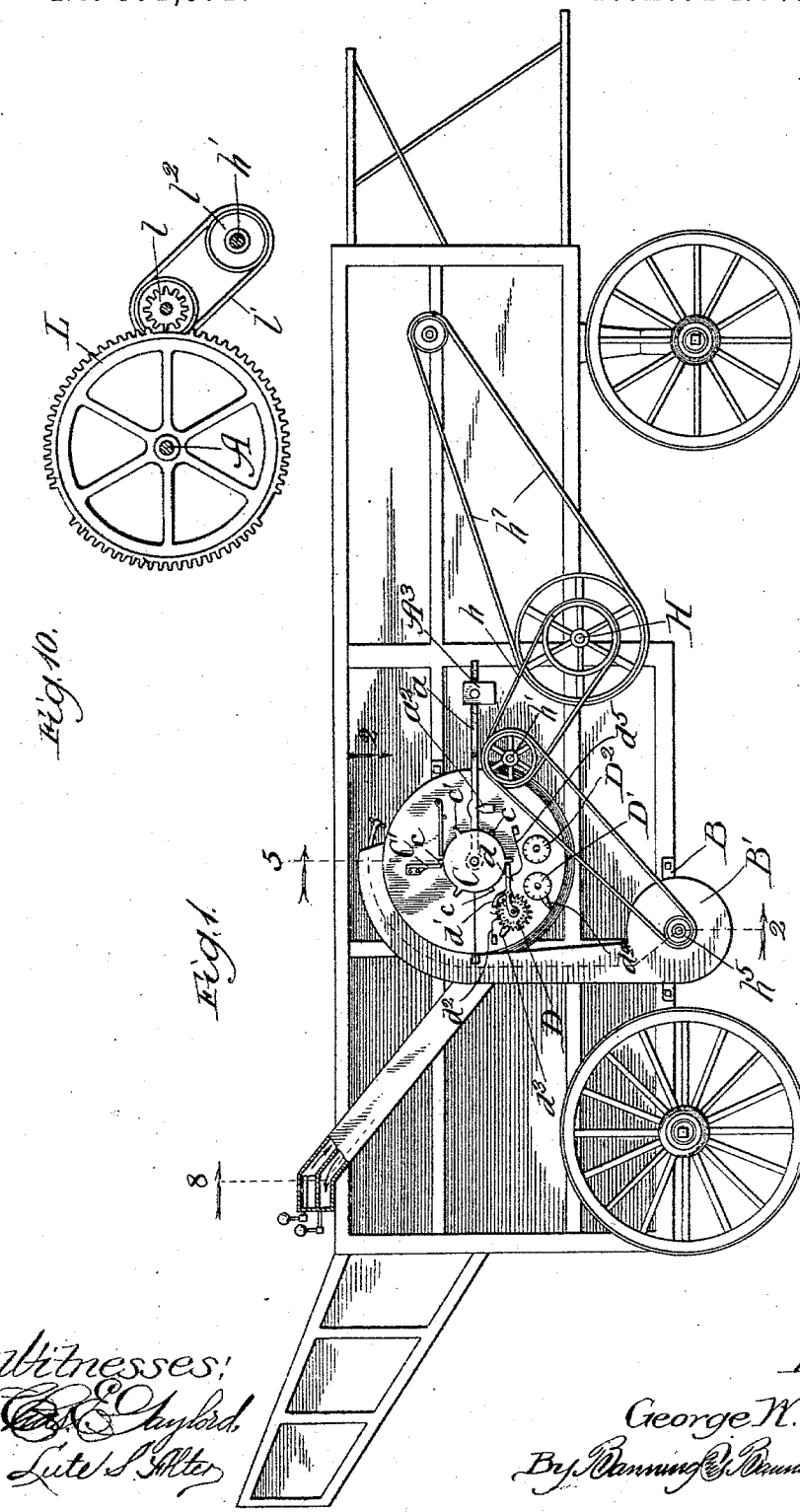
Witnesses:
Inventor:
George W. Kramer,
By Banning & Banning & Sheridan,
Att'ys (No Model.) 3 Sheets—Sheet 2.
G. W. KRAMER.
APPARATUS FOR WEIGHING AND CONVEYING GRAIN.
No. 571,571. Patented Nov. 17, 1896.
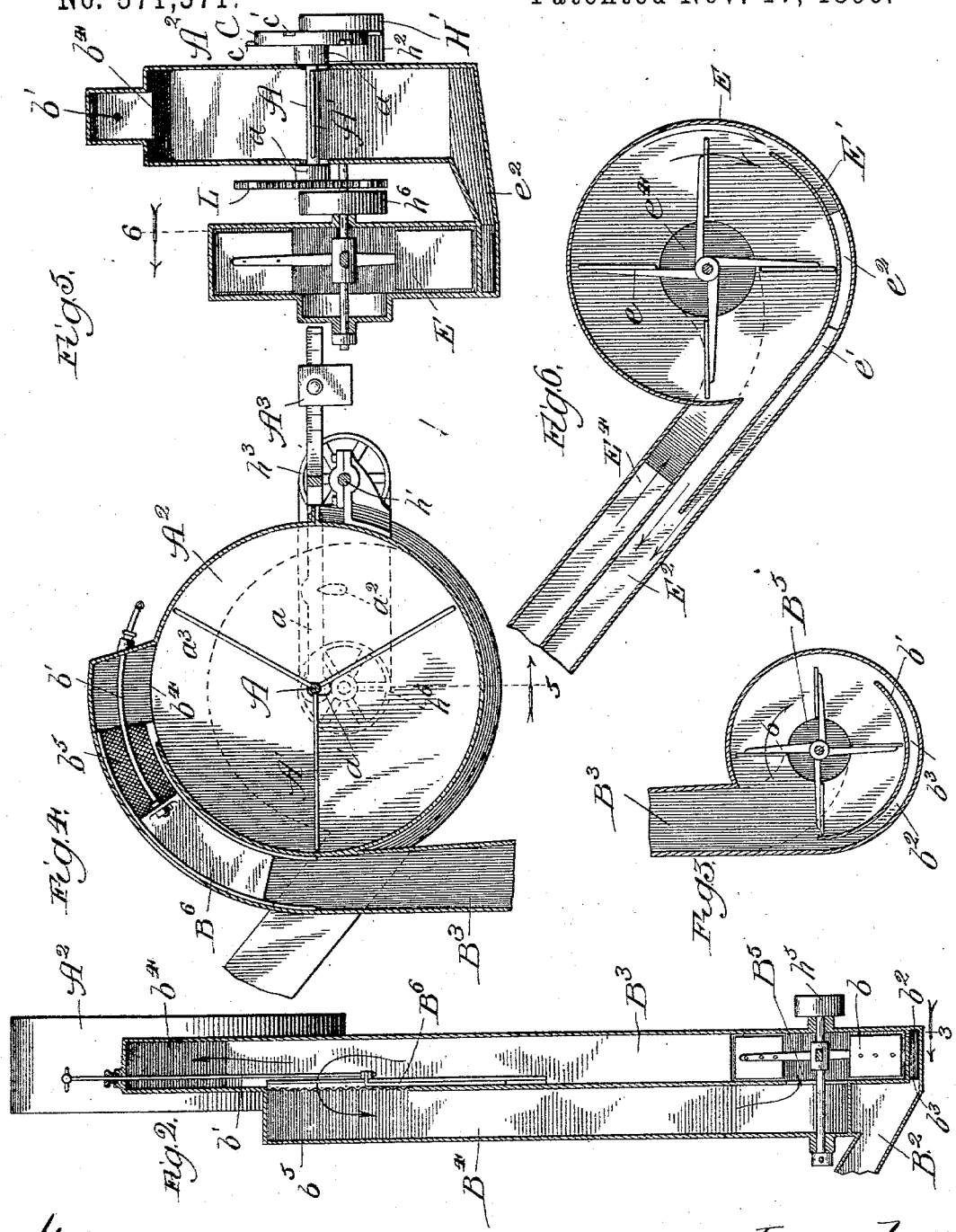

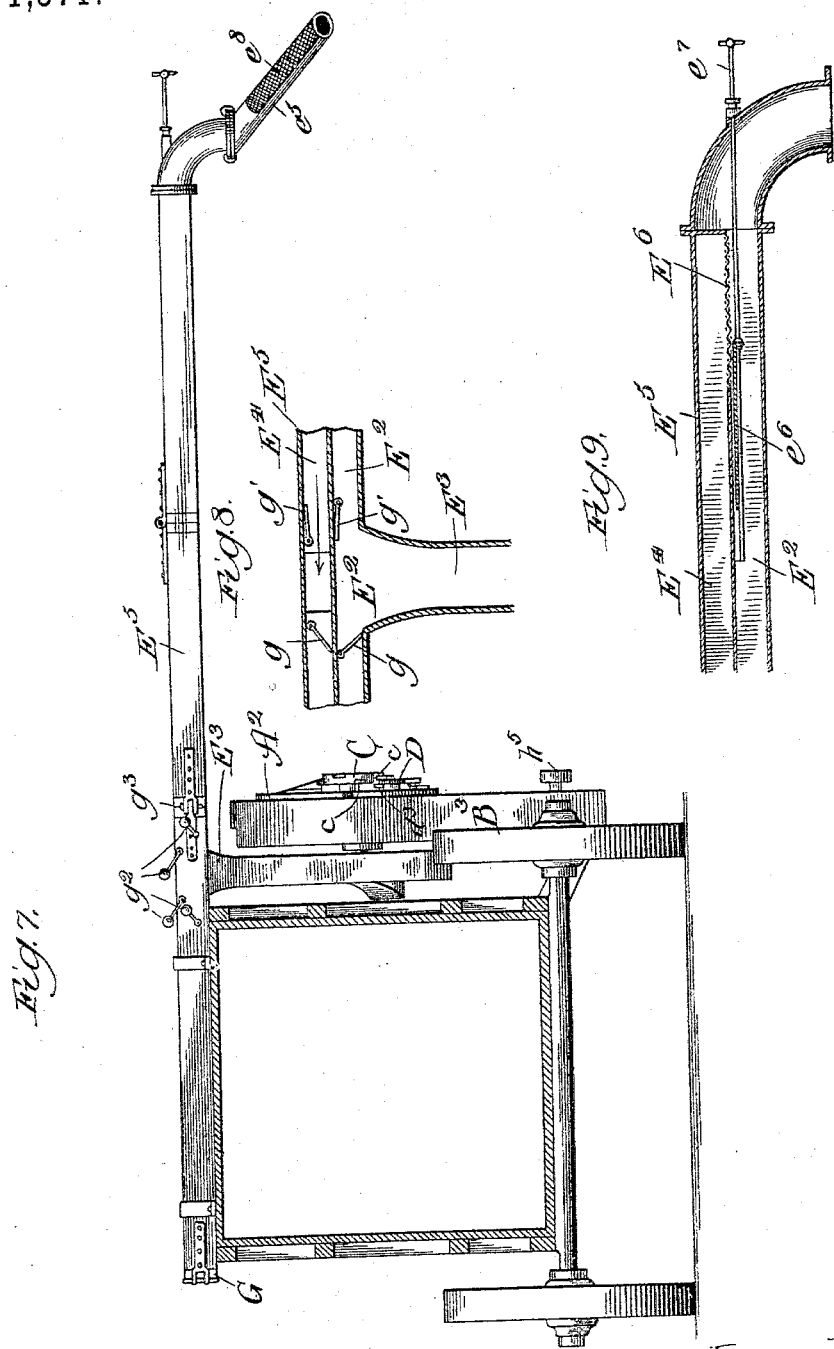

UNITED STATES PATENT OFFICE.

GEORGE W. KRAMER, OF RACINE, WISCONSIN.

APPARATUS FOR WEIGHING AND CONVEYING GRAIN.

SPECIFICATION forming part of Letters Patent No. 571,571, dated November 17, 1896.

Application filed December 24, 1894. Serial No. 532,865. (No model.)

*To all whom it may concern:*

Be it known that I, GEORGE W. KRAMER, residing at Racine, Wisconsin, have invented certain new and useful Improvements in Apparatus for Weighing and Conveying Grain, of which the following is a specification.

The object of my invention is to provide a simple, economical, and efficient grain conveyer and weigher especially adapted to be used in connection with portable grain-threshing machines; and the invention consists in the features and combinations hereinafter described and claimed.

In the drawings, Figure 1 is a side elevation of my improvement attached to a portable grain-thresher; Fig. 2, a sectional elevation of the conveyer shown in diagrammatic form; Fig. 3, a sectional elevation of one of the exhaust and blowing fans; Fig. 4, a sectional elevation of a portion of the apparatus, taken on line 4 of Fig. 5; Fig. 5, an enlarged transverse sectional view taken on line 5 of Fig. 4; Fig. 6, a sectional elevation of a portion of the mechanism, taken on line 6 of Fig. 5; Fig. 7, an end elevation of the thresher, partly in section, showing my improvements attached thereto; Fig. 8, an enlarged sectional detail taken on line 8 of Fig. 1; Fig. 9, an enlarged sectional elevation of a portion of the discharge-pipe, and Fig. 10 a detail of the scale-rotating mechanism.

In describing my invention I will not attempt to give any detailed information of the thresher or the means by which it is made portable, as this does not form any material novel feature of the invention, and also from the fact that the construction of such threshers, portable and otherwise, are well known by those skilled in the art.

My invention relates particularly to a mechanism for conveying grain from a thresher, weighing it and delivering it at some point away from the thresher, either to load a wagon or fill packages, so that the same may be carried away or stored, as desired. It is desirable during this process to keep a record of the amount or weight of grain passing through the conveyer, and to attain these ends my invention is designed.

In constructing my improvement I will first describe the apparatus for weighing the grain. (See Figs. 1 and 4.)

I provide a rotating spindle A, which is journaled near one end of a suitable scale-beam $a$, and provide it with a plurality of radial blades A', which form the platforms of a scale as they are brought to a substantially horizontal position. Surrounding and inclosing these rotating platforms is a cylindrical drum-shaped casing $A^2$ of the desired size, the heads of which are slotted where the rotating spindle enters, as at $a'$, in order to permit the free vibrating movement of the scale. The scale-beam is supported on a knife-edge $a^2$, and is provided at its outer end with the usual graduations and a balancing-weight $A^3$ to determine the unit of grain to be weighed. The rotating scale-platforms are so constructed and arranged that when they are in the position shown in Fig. 4 the platform occupying the horizontal position is adapted to support the weight of the grain until it balances or slightly exceeds the weight at the opposite end of the scale-beam, when it is depressed, its shaft liberated (by means hereinafter described) and allowed to turn and discharge the grain therein and bring the next succeeding platform $a^3$ into a horizontal position, when the scale returns to its normal up position and is locked in such position (by means hereinafter described) to weigh the next measure of the grain.

The scale may be secured to a wagon in any convenient manner, and in order to supply the scale with a quantity of grain to be measured or weighed I provide a pneumatic conveyer, which is constructed in the following manner: Attached to the thresher, as at B, is a cylindrical drum-shaped casing B', which contains a rotating fan $b$, having a plurality of radial fan-blades, which may be constructed in any usual manner. The rotatable shaft of the fan is set eccentrically with the casing, so that an interior or false bottom $b'$ may be inserted in the casing and form a feed-channel $b^2$ between it and the exterior portion of the casing, so that the grain, as it is fed down through a chute $B^2$ from the bottom of the wagon, enters the casing of the fan at $b^3$, while the false bottom protects the grain from being injured by the revolving blades of the fan. At the same time—and during the revolution of the fan, which rotates in the direction indicated by the arrow—a portion of the air is driven into the feed-channel, and, contacting the grain, forces it up through a tube or channel B³, where it passes over the curved portion and falls down through an opening b⁴ into the scales to be weighed. The major portion of the air is driven up back of the grain and assists in propelling it along. It is desirable, however, that the air should not enter the scales to form an artificial pressure or to agitate the grain therein. To avoid this and use the same air over again, I return the same air back to the exhaust-opening of the fan and form a complete circuit of air, and thus to a large extent make, in the true sense of the word, a pneumatic conveyer. In order to accomplish this result, I divide the tube which incloses the delivery-channel B³ into two portions and make a return or exhaust channel B⁴, which has communication near its outer end with the delivery-channel B³; but such communication is intercepted by a wire screen b⁵, which prevents the grain from entering the exhaust-channel, but allows the air to return to the supplying mechanism. Thus the grain is forced up by air-pressure until it abuts against the end of the channel, when the air, or the larger portion of such air, contained in the grain is exhausted and returns back through the screen and exhaust-channel to enter the fan through its exhaust-opening B⁵, while the grain itself drops down through the opening b⁴ into the weighing-scales.

In order to regulate the supply of air to the fan, and thus control the efficiency of the fan, I provide a slide-valve B⁶, having a curved circular rod b⁶, extending out through the end of the channel, so that the size of the screen-opening may be regulated at will to exhaust as much or as little of the air from the grain as seems desirable to obtain the maximum efficiency of the conveyer.

In order to hold the scale in its locked position—that is, to prevent it from rotating while weighing the grain—I provide the outer end of the rotating spindle with a toothed disk C, that has two sets of teeth, one a set of stop-teeth c to prevent the spindle from rotating and which are located near the inner peripheral edge of the toothed disk, and a second set of ratchet-teeth c', located near the outer peripheral edge of the disk, to actuate the registering mechanism, as hereinafter described. The number of stop-teeth correspond to the number of platforms on the scale and are so located on the disk as to hold one of the platforms in substantially a horizontal position. Attached to the outer drum-casing of the scale is a stop C', against which the stop-teeth are adapted to impinge when the scale is in its normal up position. As the scale fills with grain and balances the weight at the outer end of the scale-beam the scale is depressed, carrying down with it the toothed disk with its stop-teeth away from contact with the stop. The weight of the grain, which is to one side of the center of the rotating spindle, rotates the scale and discharges the grain, thereby allowing the weight to bring the scale back to its up normal position, so that the next succeeding stop-tooth strikes against the stop and holds the next platform in a horizontal position.

To facilitate the rotation of the scale and prevent clogging of the mechanism, it may be desirable to provide positive rotating mechanism, as follows: Attached to the inner end of the shaft is a gear-wheel L, which has portions of its periphery left blank, without teeth, so that a driving-pinion may revolve freely when the scale is in its normal position. Mounted in suitable bearings adjacent to the gear-wheel is a toothed pinion l, (see Fig. 10,) adapted to drive such gear. A belt l' connects a driving-pulley l² on shaft h' with a driving-pulley on the pinion-shaft. When the parts are in their normal position, the pinion revolves freely, but as the scale is lowered the teeth on the gear-wheel are engaged by the driving-pinion and the scales rotated until the next blank space is reached. The body of grain is then dumped and the scale returned to its normal position.

It is necessary, in order to keep a record of the amount of grain weighed, to have registering mechanism that will keep tally of the number of units of grain that has passed through the weigher. In order to accomplish this result, I provide several rotating disks D, D', and D², which have suitable figures engraved or printed thereon and which bear the relation to each other of units, tens, and hundreds. Describing the units-disk, it has thereon any number or ten figures and is pivoted or secured to the casing-scales in any convenient manner, and a vibrating lever d is pivoted on its axis, while its free end is brought out adjacent to the toothed disk on the scales, so that as the toothed disk revolves one of the teeth c' will contact with the vibrating lever, depressing it, when its pawl d', which is engaging the gear-teeth of the units-disk, will rotate the units-disk substantially one-tenth of its rotation. A detent-pawl d² prevents further or backward rotation of the units-disk. The units-disk is provided with one long tooth d³, which is adapted to engage the long-tooth on the tens-disk and rotate it one-tenth, while the tens-disk is provided with one long gear-tooth d⁴, which during this revolution engages the hundreds-disk and rotates it, thus keeping a complete record, up to one thousand, of the number of units weighed of grain that has passed through the scale. A spring d⁵ serves to keep the vibrating lever in a normal position to be contacted by the toothed disk during its revolutions. I have described this recording mechanism in order to give a clear idea of one kind of registering mechanism; but it will be readily understood that any usual registering device may be used, and I do not desire to be limited to the above-described mechanism.

When the grain has been weighed, it is desirable that it should be delivered to any desired point and preferably at some distance from the thresher. In order to accomplish this result, I provide a second air-fan and casing E, arranged between the scales and the body of the thresher and secured to one or both in any convenient manner. (See Figs. 5 and 6, which is constructed much in the same manner as that shown in Figs. 1 and 3.) A cylindrical drum-shaped casing E is provided, which has in its interior cylindrical chamber a rotating fan provided with any desired number of blades $e$. The shaft of the fan is in this instance also inserted in the casing eccentrically with the casing, and at the lower portion I provide a false bottom E', which leaves a channel $e'$ extending between it and the outer casing, so that grain may come in through an opening $e^2$, and the air entering in the rear of the chamber, near the arrow, will force the grain up through this channel into the outer delivering-channel $E^2$. The body of air following from the main chamber of the fan forces the grain along and upward through a tube $E^3$, which contains these channels. This tube, as in the previous one, is preferably provided with two channels, the delivery-channel $E^2$ and the return or exhaust channel $E^4$, by which the air is sucked or exhausted back in through the exhaust-opening $e^4$ of the fan. The upper or T-shaped portion of the delivery tube or conveyer, as at $E^5$, is also divided, so as to form a continuation of the two channels, the delivery-channel $E^2$ and the suction or exhaust channel $E^4$, and is built up in sections to any desired length. The outer end is provided with a delivery-spout $e^5$, by which either packages may be filled or the grain delivered into the body of the wagon. These two channels, the delivery and the exhaust channels, have only one point of communication with each other, and that near the spout, where a wire screen or piece of reticulated material $E^6$ is interposed, so that air may be exhausted or sucked out of the passing grain, but the grain itself is forced along and out through the spout. A slide-valve $e^6$ is arranged so that the screened opening may be as large or as small as desired, in order to regulate the efficiency of the conveyer, and is provided with a handle $e^7$, extending out near the edge of the spout to open or close such valve.

In Fig. 7 the delivery-conveyer is clearly shown, and it will be seen that the spout is attached to the right hand, but that it is built in a T shape, so that a portion extends to the left and over the body of the wagon. By examining Fig. 8 it will be seen that the channels also, the delivery and exhaust channels, extend in both directions. This is for the purpose of delivering the grain to either side as desired. When it is desired to deliver it to the right of the wagon, as shown in Fig. 7, the left-hand end is provided with a cap G, and the channels, near where they branch off from the vertical casing, are provided with interior valves $g$ $g$ $g'$ $g'$. The valves to the left, as at $g$, are closed. Those at the right, as at $g'$, are open. These valves are also provided with extending handles $g^2$ to render the valves movable from outside the casing. When it is desired to use the delivery-spout to the left of the wagon, the sections are taken off at $g^3$ and the cap G removed and placed at that end, and the sections of the spout are then fastened to the left-hand end of the delivery-conveyer.

The spout shown as attached to the delivery-conveyer is preferably made single, and if made of an imperforate tube some of the air which is forced along through the grain would come out through the end of the tube and disturb or blow the grain about, rendering it obnoxious to the operator when filling packages. In order to obviate this difficulty, I have cut away a portion of the tube or spout and secured thereto along its lateral surface a piece of reticulated material or wire mesh $e^8$, so that the grain is forced down it through the opening while the air may escape out through the screen. This minimizes the danger of spraying the grain and allows it to be fed or delivered into the packages in a constant steady stream.

In order to operate the mechanism, I provide a driving-shaft H, which is attached to the thresher at any convenient point and may be driven either by a portable engine or any suitable source of motive power. This shaft is provided with several driving-pulleys, one pulley of which, by means of the belt $h$, is adapted to drive a pulley H' on the shaft $h'$. The shaft $h'$ carries the two pulleys $h^2$ and $h^3$, one of which, $h^2$, by means of a belt $h^4$, engages and drives the pulley $h^5$, which actuates the fan that operates the pneumatic conveyer to feed the grain to the weighing-scales, while the other pulley, $h^3$, by means of a belt (not shown) drives the pulley $h^6$ on the second pneumatic fan to operate the same. The belt $h^7$ and the pulleys which it is engaged with form no portion of my invention, and consequently need no detailed description here.

In operation the motor is started and the above-described pulleys and belts are driven, so that the primary pneumatic conveyer delivers the grain, in the above-described manner, to the scales. The scales receive a predetermined weight of grain when it is depressed and will actuate the recording mechanism to record on the registering mechanism. This grain is then, as above described, passed into the second pneumatic conveyer and delivered to the point of delivery, as above described, and as fast as the grain is delivered to the scales it is weighed, registered, and delivered in packages or at any desired point until all the grain desired has been weighed.

While I have entered into a more or less detailed description of my improvements and as being embodied in precise forms, I do not desire to be limited thereto unduly any more than is pointed out in the claims. On the contrary, I contemplate all proper changes in form, construction, and arrangement as circumstances may suggest or necessity render expedient.

I claim—

1. In an apparatus for weighing and conveying grain, a grain-conveyer consisting of an inclosed delivery-channel to convey grain from a point of supply to a point of deposit, an inclosed return or exhaust channel connected with the delivery-channel at or near its point of discharge or deposit and with an air-blower to complete a circuitous route for a current of air and facilitate the conveying of grain, an air-blower connected at its inlet-opening with the return-channel, a partition in the blower-casing so as to provide a space between its operative mechanism and the case for the introduction of the material to be conveyed and connected with the delivery-channel at such point, and an opening in the casing whereby the material may be introduced into the material-space of the blower, substantially as described.

2. In an apparatus for weighing and conveying grain, a grain-conveyer consisting of an inclosed delivery-channel to convey grain from a point of supply to a point of deposit, an inclosed return or exhaust channel connected with the delivery-channel at or near its point of discharge and with an air-blower to complete a circuitous route for a current of air and facilitate the conveying of grain, a screen interposed between the delivery and return channels to prevent material entering the return-channel and assist in discharging material, a rotating fan connected at its inlet-opening with the return-channel, a partition in the blower-casing so as to provide a space in the lower portion for the introduction of material and connected with the delivery-channel at such point, and an opening in the casing whereby the material may be introduced into the material-space of the blower, substantially as described.

3. In an apparatus for weighing and conveying grain, a grain-conveyer consisting of an inclosed delivery-channel to convey grain from a point of supply to a point of deposit, an inclosed return or exhaust channel connected with the delivery-channel at or near its point of discharge and with an air-blower to complete a circuitous route for a current of air and facilitate the conveying of grain, a screen interposed between the delivery and return channels to prevent material entering the return-channel and assist in discharging material, a rotating fan connected at its inlet-opening with the return-channel and mounted in its casing so as to provide a space in the lower portion for the introduction of material and connected with the delivery-channel at such point, a partition interposed between the rotating fan and the casing to inclose the material-space and prevent injury to the grain, and means whereby the material may be introduced into the material-space of the blower, substantially as described.

4. In an apparatus for weighing and conveying grain, a grain-conveyer consisting of an inclosed delivery-channel to convey grain from a point of supply to a point of deposit, an inclosed return or exhaust channel connected with the delivery-channel at or near its point of discharge and with an air-blower to complete a circuitous route for a current of air and facilitate the conveying of grain, a screen interposed between the delivery and return channels to prevent material entering the return-channel and assist in discharging material, a sliding gate over such screen to regulate the size of the opening, a rotating fan connected at its inlet-opening with the return-channel and mounted in its casing so as to provide a space in the lower portion for the introduction of material and connected with the delivery-channel at such point, and means whereby the material may be introduced into the material-space of the blower, substantially as described.

GEO. W. KRAMER.

Witnesses:
J. W. O. HARROW,
E. W. EVANS.